July 29, 1952  R. F. MITCHELL  2,604,809
OPTICAL MEANS FOR EVALUATING SURFACE FINISH BY
MEASUREMENT OF DIFFERENTIAL LIGHT SCATTERING
IN A SCHLIEREN TYPE OPTICAL SYSTEM
Filed June 1, 1948

Witnesses  INVENTOR.

Patented July 29, 1952

2,604,809

UNITED STATES PATENT OFFICE 2,604,809

OPTICAL MEANS FOR EVALUATING SURFACE FINISH BY MEASUREMENT OF DIFFERENTIAL LIGHT SCATTERING IN A SCHLIEREN TYPE OPTICAL SYSTEM

Reginald Fawn Mitchell, Mount Vernon, N. Y.

Application June 1, 1948, Serial No. 30,465

6 Claims. (Cl. 88—14)

This invention covers optical means for evaluating or measuring surface roughness without the use of a stylus or similar mechanical means contacting the surface. It is an object of this invention to evaluate or measure surface finish of any surface without the possibility of scratching or marring very delicate surfaces by stylus scratching or suchlike. It is also an object of this invention to avoid errors such as those which are a function of the radius of a stylus point. It is a further object of this invention to direct a controlled beam of light, a spot, slit or similar type of illumination on to a surface to be checked so that the amount or intensity of the scattered portion of the light reflected into or otherwise passed on to the receiving end of the instrument is a direct function of the roughness or finish of that surface.

Specifically this invention covers the use of a "Schlieren" "light-block" type of optical system which normally passes no light through it, but when a rough surface is used as a reflector, the system will pass through the light scattered by such a rough surface in proportion to the roughness of that surface.

Further, it is an object of this invention that the device be so made that the light scattered by a rough reflecting surface be passed on to the output end of the instrument so that it can be picked up either by eye or preferably by a photocell. An obvious concomitant is that the output of the photocell be used, either direct or amplified as necessary, to operate meters, relays, alarms, recorders or similar devices.

Other features of the invention will be apparent from detailed consideration of the specifications.

Figure 1:
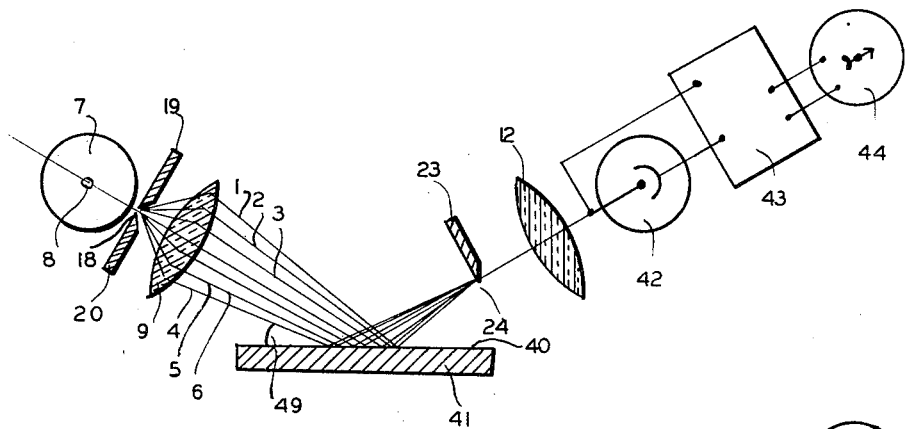
Fig. 1 shows a typical Schlieren "light-block" optical system arranged with a plain mirror reflector set in the light block and with a photocell, optional amplifier and meter arranged as will be described.
Figure 2:
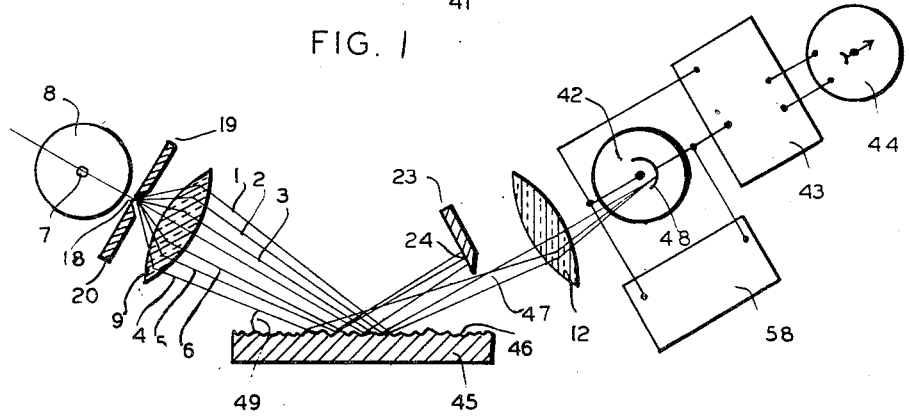
Fig. 2 shows a typical Schlieren "light-block" optical system arranged with a rough surface as a reflector in the light block and with a photocell, optional amplifier, meter and a relay or any similar device aranged as will be desedibed.

In Fig. 1, the rays of light 1 to 6 inclusive emanate from a slit 18 formed by two knife edge masks 19 and 20. The slit 18 is illuminated by the filament 7 of the lamp 8 and the rays 1 to 6 are collected by the lens 9 (which prefer- ably is highly corrected) and reflected by the perfect mirror surface 40 of a test or setting piece 41 and the rays are focused at a position 24. At this position 24 is set a second (blocking) mask 23, shown as a knife edge just barely blocking any light from passing on to the collecting lens 12 and the photocell 42. A narrow opaque line on a clear glass can be used instead at 24. In Fig. 1 an amplifier 43 is shown connected to the photocell 42 to operate a meter or similar indicating device 44. With a mirror surface 40 used and the device set as described, no light will reach the photocell 42 and the meter 44 will read zero. However, if a rough surface 46 Fig. 2, is used instead of the mirror surface 40, some light will be scattered as indicated by the rays 47 and these scattered rays 47 and only the scattered portion of the light will reach the lens 12 and the sensitive surface 48 of the photocell 42.

It is possible to use the eye for visual evaluation of surface finish. For instance, it is possible to place a known surface and an unknown surface side by side and get a fairly good visual comparison of the two surfaces. However, such methods are not very accurate and are of limited value and are not described in detail. Because the eye cannot accurately evaluate the amount or intensity of light, the use of a photocell and associated devices is preferred. Depending on the sensitivity of the photocell used, it may be necessary to employ an amplifier as at 43 to amplify the photocell output in order to operate a meter 44 or other devices such as relays, alarms, recorders and suchlike. If an amplifier is used, it must have very accurately controlled characteristics and must be free from drift and other variations. Therefore it may be preferable in practice to eliminate the amplifier and use a stable barrier cell at 42 and to use a relatively powerful light source at 7 or a very sensitive meter at 44, or all together. The main point is that the meter or indicating device 44 must indicate or read accurately the minute photocell currents resulting from the minute variations in the scattered light 47 which reaches the photocell through the "light-block," which variations of scattered light correspond to variations in roughness or scattering power of the surface used at 46.

It is obvious to those skilled in the art that other devices 58, such as relays, recorders, alarms or similar devices can be used in parallel to the meter 44 as indicated or can be used instead of the meter, with or without an amplifier as preferred; therefore such variations are merely indicated and not described in detail.

The angle 49 at which the rays 1 to 6 strike the mirror surface 40 or the rough surface 46 is important. If this angle is too small only a very rough surface will scatter light as only the peaks of the rough surface will be illuminated. On the other hand, if the rays 1 to 6 strike the surface at or near right angles there will be little or no effect due to surface variations. The angle 49 can be selected to suit the range of surface roughness to be evaluated to secure maximum sensitivity. As a matter of convenience, the angle 49 can usually be at approximately 45° but can vary quite a bit from this. Once decided on, the angle 49 should be fixed, as varying it will affect the calibration of the meter 44. For maximum versatility, several angular settings could be provided for multiple scales or suchlike employed on the meter. Also, location of the surface 40 at the right position is important in order to insure the reflected light from a perfect mirror surface being imaged precisely on the second mask as explained.

Figure 3:
Fig. 3 shows a set of special masks such as may be used in the device for certain purposes.
Figure 3:
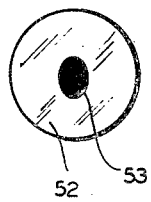
Figure 4:
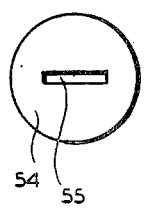
Fig. 4 shows another set of masks which may have certain applications as described.
Figure 4:

While it is possible to calculate the amount of light scattered by a surface of given roughness for light of known intensity and area striking the surface at a known angle, such theoretical methods of calibration are probably not necessary or advisable for any ordinary purpose and are tedious and time consuming to say the least. For most applications it is probably easier and as accurate if not more accurate to calibrate the instrument from a series of surfaces the surface roughness of which have been measured by interferometer, special stylus or other acceptable means. For some purposes it may be desirable or necessary to measure the amount of light scattering per unit area of a surface to be inspected or evaluated. In such cases a unit area of the surface should best be illuminated by a spot or slit of light of such controlled unit area and preferably of controlled shape as well. For example, an opaque mask such as shown by 50 in Fig. 3 could be used in place of the slit 18. In this mask 50 is a hole or clear aperture 51 of controlled area and shape. The elliptical shape shown in Fig. 3 is intended to match the angle 49 at which the beam is projected on to the surface so that the spot of light on the surface 40 or 46 will be circular in shape and of unit area; obviously the mask 50 must be correctly oriented in the device to insure the spot projected being circular. Similarly, the type of mask shown by 54 in Fig. 4 can be used to project a spot of light on to the surface which would be square in shape and of controlled area. Here again the dimensions of the rectangular hole or aperture 55 must match the angle 49 used and the rectangular aperture 55 must also be correctly oriented in the device. If a mask aperture such as the rectangular one 55 is used oriented at right angles to the setting just discussed the spot of light projected on to the surface will be long and narrow. By making the aperture 55 long and narrow it is easily possible to project a thin slit of light on to the surface and yet control the area of the surface so illuminated. Such a controlled slit of illumination might find application in checking cylindrical surfaces; in such cases the slit of light should preferably be oriented along the non-curved axis of the cylindrical surface to eliminate a "focusing" effect from the curved axis if this were not done. When masks such as 50 or 54 just discussed are used to illuminate the surface being checked with a light spot of controlled or unit shape and area, then matching blocking masks must be used in the receiving end of the "light-block" device. For example, when an oval mask 51 is used at one end, an opaque oval mask 53 must be used in the other end of the device. For convenience, a transparent piece or member 52 has an oval opaque spot 53 on it and is set into the receiving end of the unit and aligned so as to function as a blocking mask, similar to the function of such blocking masks as has been described in detail. Similarly, if a rectangular mask 55 is used in the projection end of the device, a similar blocking mask 57 must be used in the receiving end of the device. The transparent mask piece or member 56 has for convenience an opaque spot 57 on it. As before, the mask 57 must be set and aligned properly to function as a blocking mask as described.

The foregoing variations of arrangement are mentioned, not to limit the invention, but to the contrary to show the device can be adapted or used for a variety of purposes by varying masks, optical arrangement, mask orientation etc., and yet remain within the scope of this invention because the fundamental principle, that of the reflecting "light-block," is the same in all cases. In conclusion, one more variation of conventional arrangement will be mentioned to show the versatility of the method. If the second (blocking) mask, such as 23 in Fig. 1 or 2 is arranged so as to not quite block off all the light reaching the photocell enough light can get through under perfect conditions, as with a mirror surface at 40, to overcome the initial inertia of a meter, relay or any other relatively insensitive device which may be used on or with the device. Thus it would be simple to establish an arbitrary zero reference reading or setting on the meter or other device if this technique were found preferable or cheaper.

For instance, it might be possible by such means to avoid using an amplifier, the advantage of which has already been discussed. Other variations from normal procedure can similarly be made without departing from the spirit of the fundamental principle or the intention of the invention.

I claim:

1. Means for quickly and accurately measuring the relative surface roughness of any surface, said means consisting of a special "light-block" type of Schlieren optical system in conjunction with a photocell and indicating meter and including provision for locating the surface to be checked at a predetermined position and also at a preset angle of substantially 45° with respect to said "light-block" optical system which consists of an exact combination and arrangement of a light source and a projection lens between which is an opaque mask having a narrow slit opening set transversely across the optical axis of said light and lens, said lens projecting the light passing through said slit on to said surface at said predetermined position and angle so that the surface will reflect the image of the illuminated slit to a focus in precise alignment on a second mask which is preset conjugate with respect to said lens and first mask, said second mask consisting of a clear glass or light transmitting material on which is a narrow opaque band so shaped and located transversely across the axis of the reflected beam as to just barely mask the reflected slit image when a perfect mirror surface is used as the reflecting surface and which will continue to mask the main image but will allow progressively increasing amounts of light scattered by reflector surfaces of progressively increasing surface roughness to pass said second mask so as to be collected by a photocell behind said second mask which photocell will operate, with or without amplification as needed, a suitable indicating meter in proportion to said scattered light and thus indicate the relative surface roughness of the surface used as a reflector in the "light-block" optical system.

2. Means for quickly and accurately measuring the relative surface roughness of any surface, as in claim 1, where said surface to be checked is cylindrical, said positioning and locating means be such that said cylindrical surface will be oriented so that said slit illumination be along the non-curved axis of said cylindrical surface and also that the surface will be so positioned that the reflected image of said slit will be focused on said second mask to function as described."

3. Means for quickly and accurately measuring the relative surface roughness of any surface as a function of relative surface roughness per unit area, said means consisting of a special reflecting "light-block" type of Schlieren optical system in conjunction with a photocell and indicating meter and including provision for locating the surface to be checked at a predetermined position and also at a preset angle of substantially 45° with respect to the said "light-block" optical system which consists of an exact combination and arrangement of a light source and projection lens between which is an opaque mask having a clear opening set transversely across the axis of said light and lens, said lens projecting the light passing through said clear opening in said mask on to said surface at said predetermined position and angle so that said surface will reflect the image of said illuminated clear opening to a focus in precise alignment on a second mask preset conjugate with respect to said lens and opening, said clear opening in the first mask to be of such shape and size that the said surface will be illuminated only by a spot of light of unit area, said second mask consisting of a clear glass or light transmitting material on which is an opaque portion of such shape and size located transversely across the axis of the reflected beam as to just barely mask the reflected image of said illuminated opening when this image is reflected by a unit area of a perfect mirror surface used as the reflecting surface and which will continue to mask the main image but will allow progressively increasing amounts of light scattered by unit areas of surfaces of progressively increasing surface roughness to pass said second mask so as to be collected by a photocell behind said second mask which photocell will operate, with or without amplification as needed, a suitable indicating meter in proportion to said scattered light and thus indicate the relative surface roughness per unit area of the surface used as a reflector in the "light-block" optical system.

4. Means for quickly and accurately measuring the relative surface roughness of any surface, as in claim 3, where said surface to be checked is cylindrical, said positioning and locating means be such that said cylindrical surface will be so oriented that, when the first mask has a slit opening, this slit will be projected on to the cylindrical surface with the length of the slit illumination falling along the non-curved axis of the cylindrical surface and illuminating that surface for only a unit area and that this in turn be reflected by the surface to focus on said second mask as described.

5. Means for quickly and accurately evaluating the relative surface roughness of any surface, as in claim 1, except that said second mask be of such size as to just barely pass a small amount of light to the photocell when a perfect mirror surface is used as reflector, said light to be passed just enough to excite reliably an indicating meter without the use of an immediate amplifier so that when a surface of slight surface roughness is used as reflector the slight extra amount of light passed will generate enough extra current to operate said insensitive meter to give a reliable indication of the relative surface roughness of said slightly rough surface.

6. Means for quickly and accurately evaluating the relative surface roughness of any surface, as in claim 3, except that said second mask be of such size as to just barely pass a small amount of light to the photocell when a perfect mirror surface is used as a reflector, said light so passed to be just enough to excite an indicating meter without the use of an intermediate amplifier so that when a surface of slight surface roughness be used as reflector the slight extra amount of light passed will generate enough extra current to operate said insensitive meter to give a reliable indication of the relative surface roughness of said slightly rough surface.

REGINALD FAWN MITCHELL.

REFERENCES CITED

The following references are of record in the file of this patent:

UNITED STATES PATENTS

| Number | Name | Date |
|---|---|---|
| 2,222,069 | Cook | Nov. 19, 1940 |
| 2,254,062 | Devol | Aug. 26, 1941 |
| 2,304,814 | Glasser | Dec. 15, 1942 |
| 2,315,282 | Snow | Mar. 30, 1943 |
| 2,362,235 | Barnes | Nov. 7, 1944 |
| 2,424,976 | Golay et al. | Aug. 5, 1947 |
| 2,446,628 | Brown | Aug. 10, 1948 |

FOREIGN PATENTS

| Number | Country | Date |
|---|---|---|
| 459,278 | Great Britain | Jan. 5, 1937 |
| 530,724 | Great Britain | Dec. 18, 1940 |

OTHER REFERENCES

Wood, Text on Physical Optics, 3rd ed., 1936, pages 93, 94 and 97. Publ. by Macmillan Co., N. Y.

Guild, J., Article in Journal of Scientific Instruments, July 1940, pages 178–182, entitled Meter for Evaluating the Surface Finish of Metals.

Hardy and Perrin, text on Principles of Optics 1st ed., (1932) pages 331 and 332. Publ. by McGraw-Hill Book Co., New York City.